Dec. 12, 1933.　　　F. STONE ET AL　　　1,938,873
INCLINATION RECORDER FOR WELLS
Original Filed Oct. 8, 1929　　7 Sheets-Sheet 1
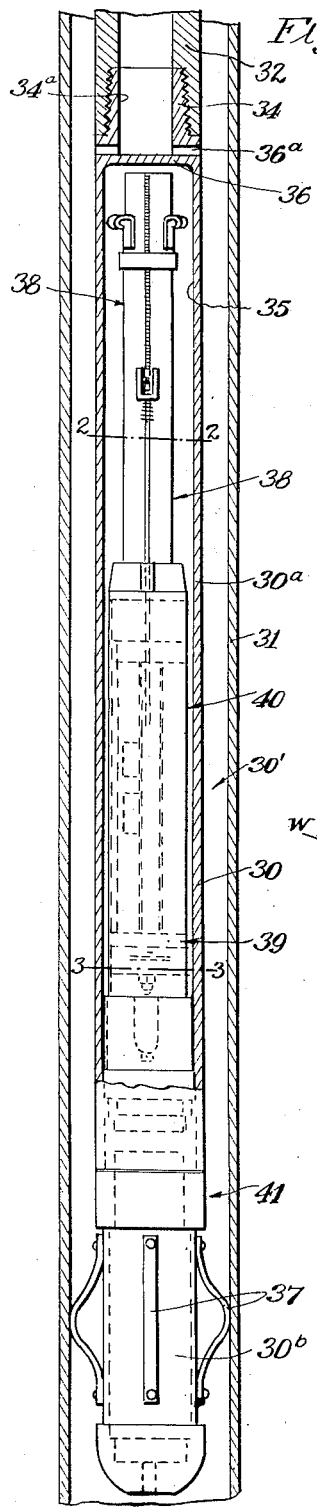
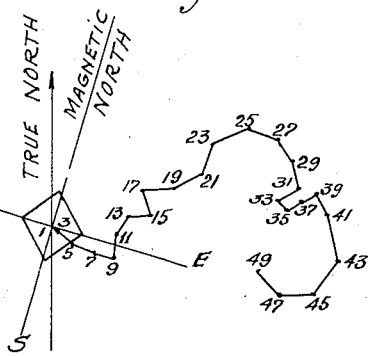
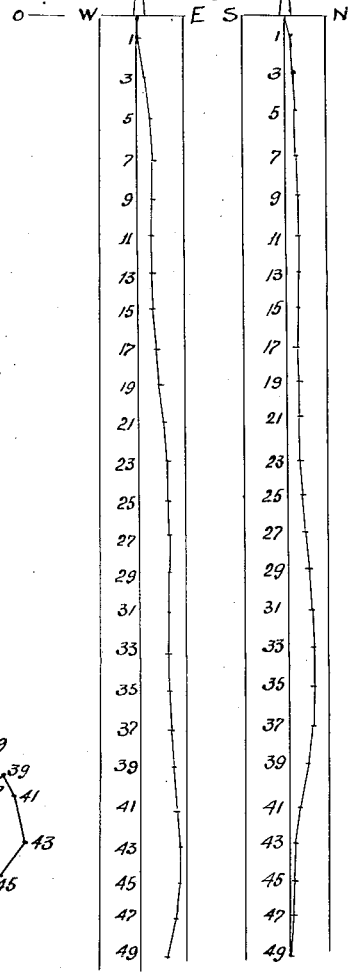
Inventors
Clarence R. Dale, Lester C. Nielson
August R. Maier, Frederick Stone
Albert L. Stone, Roy A. Silent
*Attorney.*

Dec. 12, 1933.    F. STONE ET AL    1,938,873
INCLINATION RECORDER FOR WELLS
Original Filed Oct. 8, 1929   7 Sheets-Sheet 2

Inventors.
Clarence R. Dale. Lester C. Nielson
August R. Maier. Frederik Stone.
Albert L. Stone. Roy A. Silent.

Attorney.

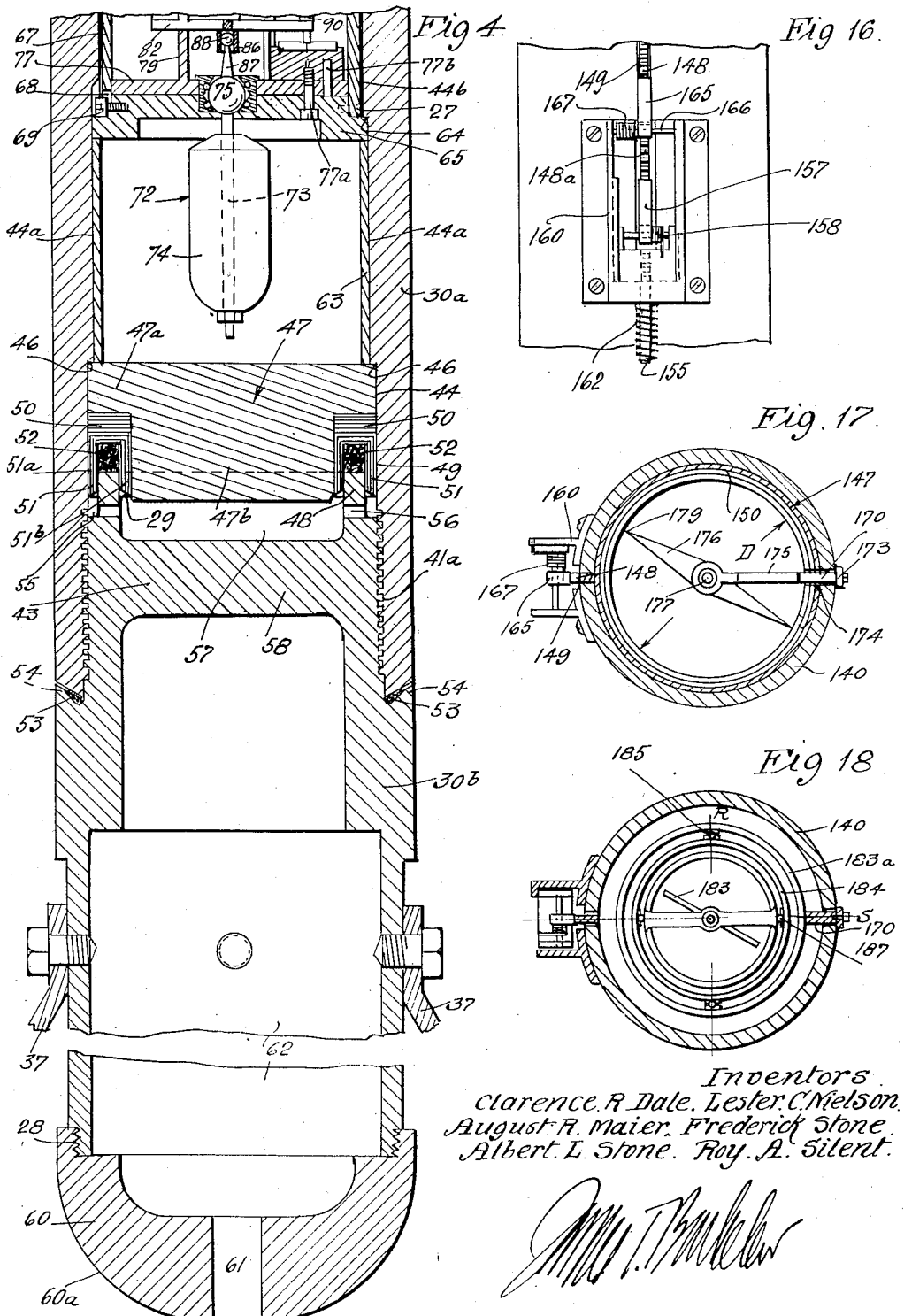

Dec. 12, 1933.  F. STONE ET AL  1,938,873
INCLINATION RECORDER FOR WELLS
Original Filed Oct. 8, 1929  7 Sheets-Sheet 4
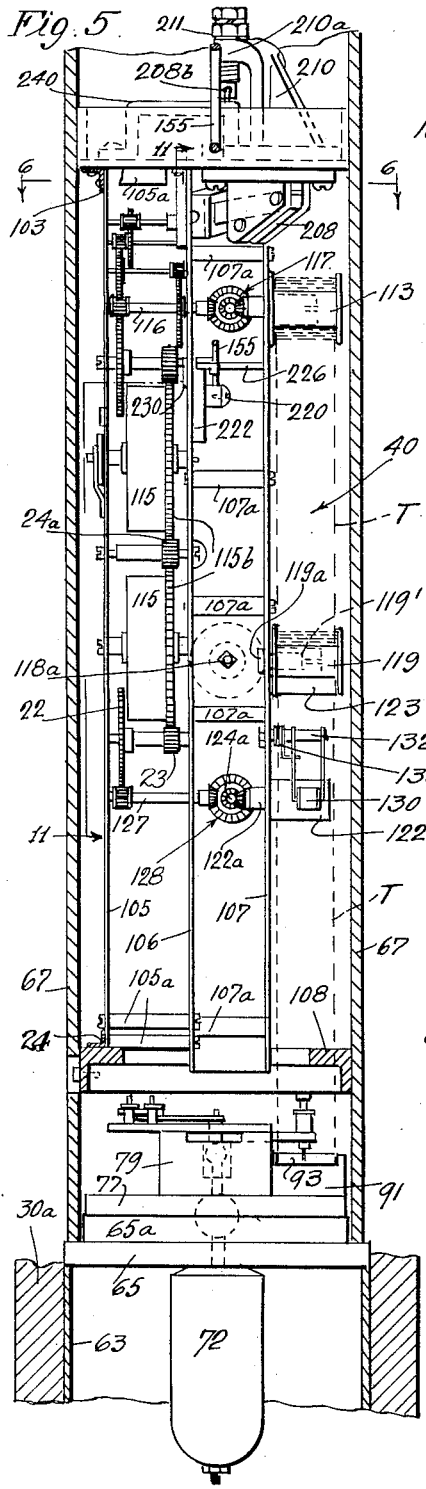
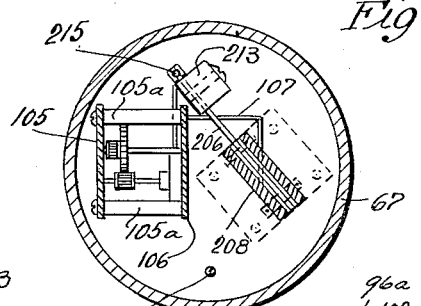
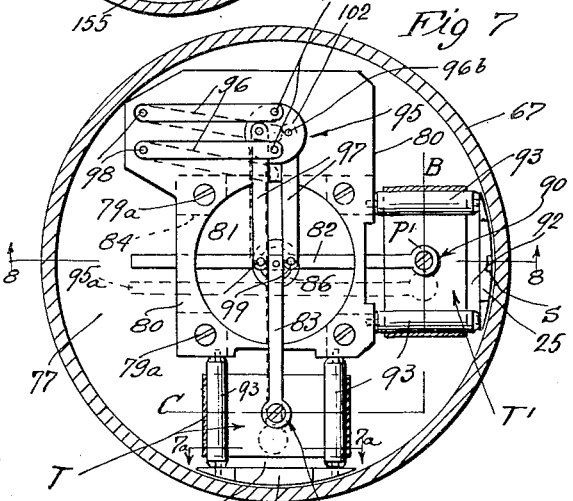
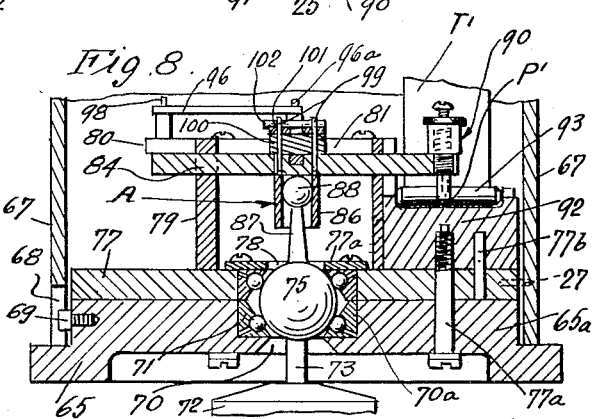
Inventors
Clarence R. Dale, Lester C. Nielson,
August R. Maier, Frederick Stone,
Albert L. Stone, Roy A. Silent
Attorney

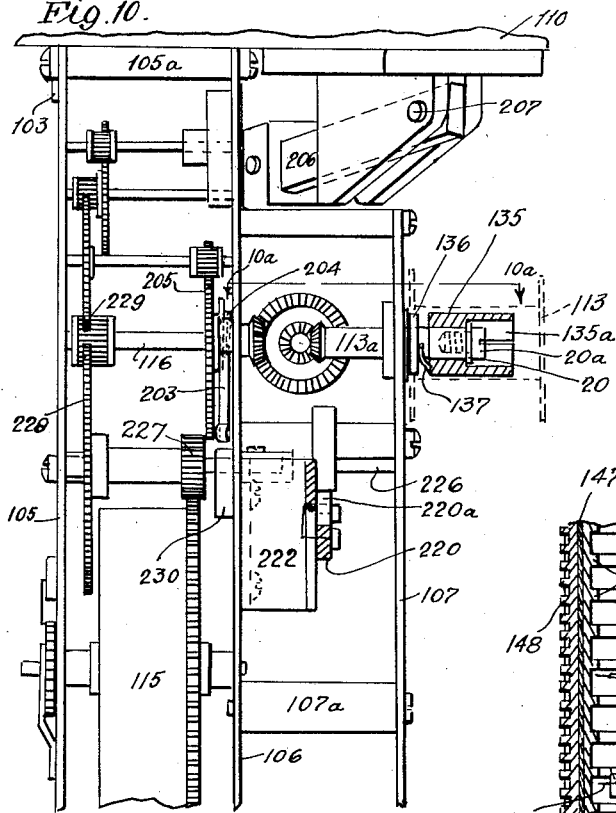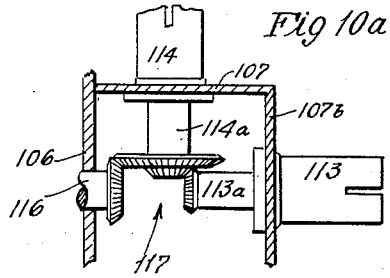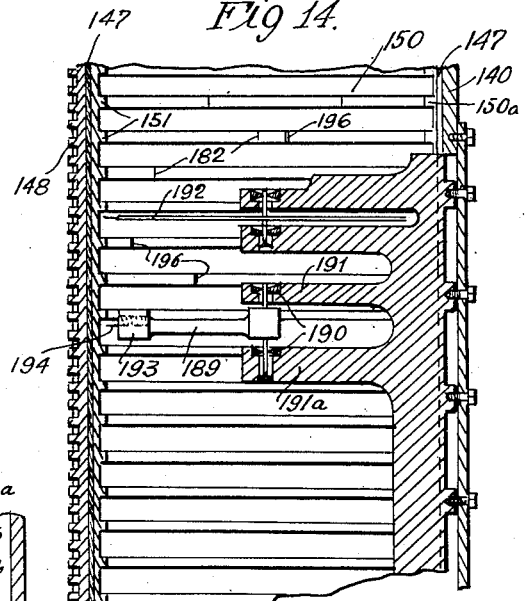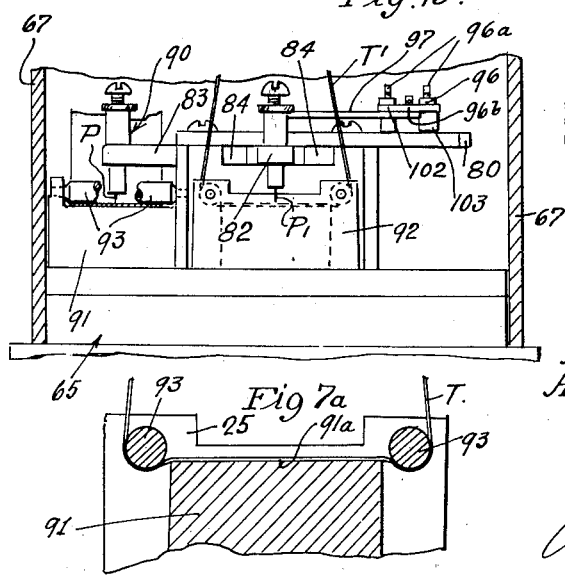

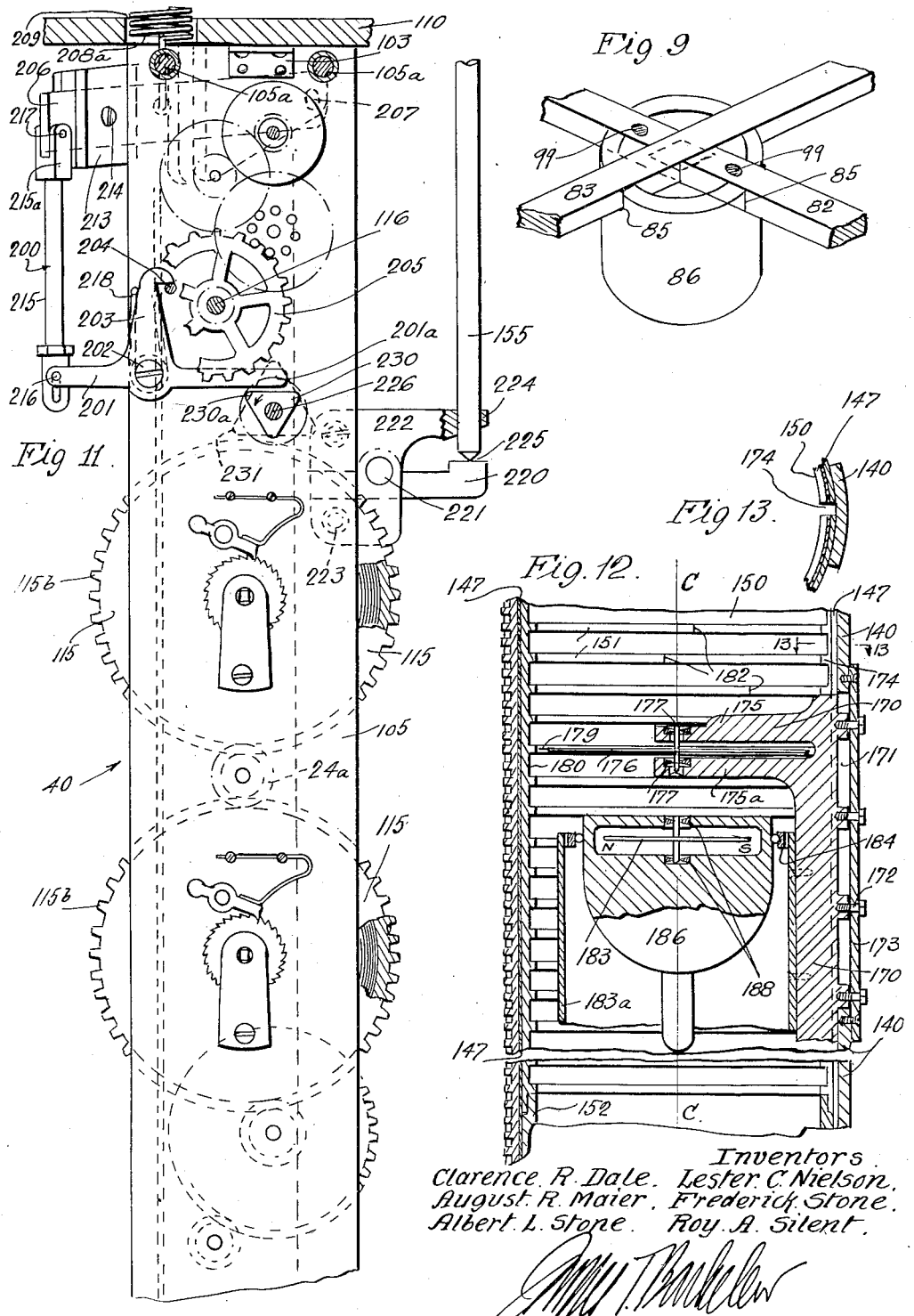

Dec. 12, 1933.    F. STONE ET AL    1,938,873
INCLINATION RECORDER FOR WELLS
Original Filed Oct. 8, 1929    7 Sheets-Sheet 7

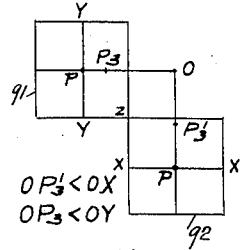
$OP_3' < OX$
$OP_3 < OY$

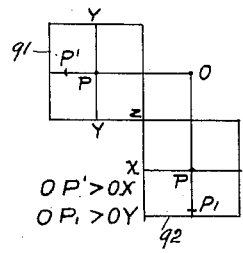
$OP' > OX$
$OP_1 > OY$

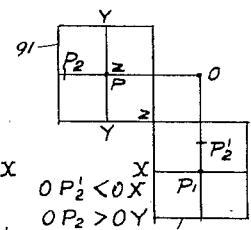
$OP_2' < OX$
$OP_2 > OY$

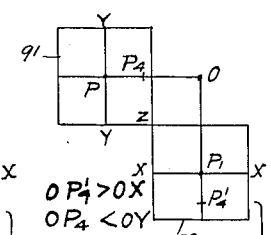
$OP_4' > OX$
$OP_4 < OY$

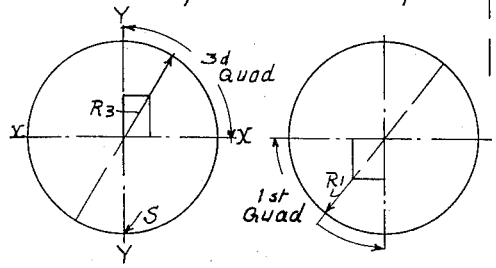 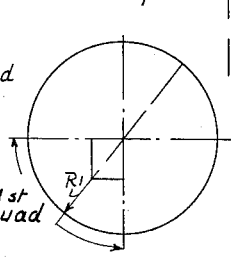 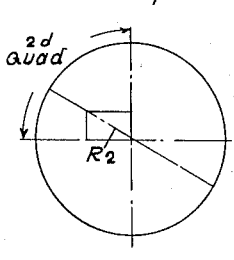 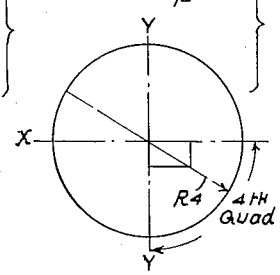

*Fig 24.*

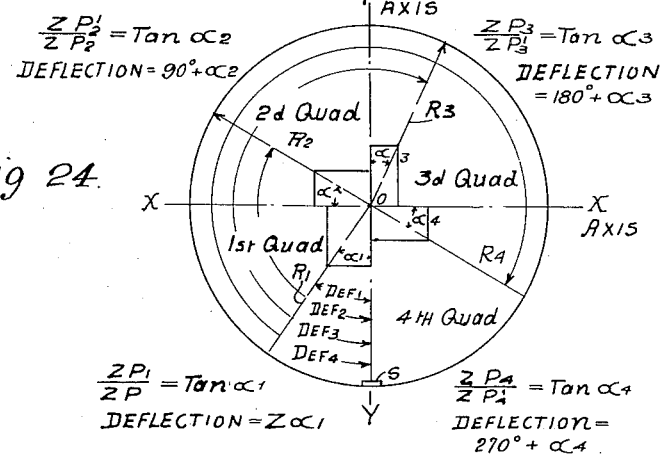

$$\frac{ZP_2'}{ZP_2} = \tan \alpha_2$$
DEFLECTION = $90° + \alpha_2$ $$\frac{ZP_3}{ZP_3'} = \tan \alpha_3$$
DEFLECTION = $180° + \alpha_3$ $$\frac{ZP_1}{ZP} = \tan \alpha_1$$
DEFLECTION = $\angle \alpha_1$ $$\frac{ZP_4}{ZP_4'} = \tan \alpha_4$$
DEFLECTION = $270° + \alpha_4$

*Fig. 19.*

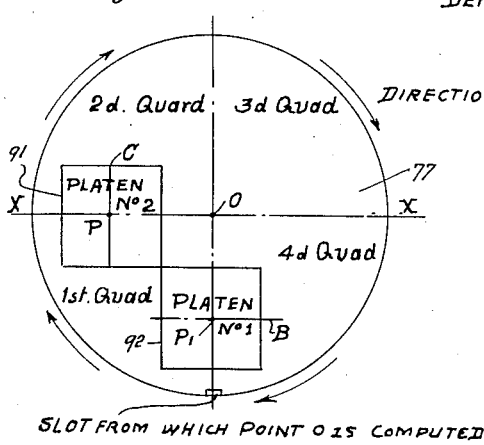

DIRECTION OF ANGULAR COMPUTATION.

SLOT FROM WHICH POINT O IS COMPUTED.

Inventors
Clarence R. Dale, Lester C. Nielson
August R. Maier, Frederick Stone
Albert L. Stone, Roy A. Silent Attorney.

Patented Dec. 12, 1933

1,938,873

UNITED STATES PATENT OFFICE 1,938,873

INCLINATION RECORDER FOR WELLS

Frederick Stone, Los Angeles, and Albert L. Stone, Redondo, and Clarence R. Dale, Hollywood, and Lester C. Nielson and Roy A. Silent, Los Angeles, Calif., and August R. Maier, Braddock, Pa., assignors, by mesne assignments, to Hydril Company, Los Angeles, Calif., a corporation of California Original application October 8, 1929, Serial No. 398,142. Divided and this application January 24, 1931. Serial No. 511,068

14 Claims. (Cl. 234—5.3)

This invention has to do with apparatus for measuring and recording the vertical deviation of any more or less vertical course which the apparatus may be caused to follow, the invention being particularly adaptable for use in determining the course followed by shafts, well bores and the like, drilled in the earth.

The subject matter of the present application is divisional of our copending application entitled "Art of well surveying", Ser. No. 398,142, filed October 8, 1929, this first filed application dealing with azimuth recorders for well surveying instruments and the like, and azimuth recorders in combination with recording devices for indicating the extent of vertical deviation of the course which the apparatus is caused to follow. The present application deals more specifically with apparatus of this latter character, that is, apparatus whereby the extent of vertical deviation may be measured and recorded.

The general characteristics and objects of the invention may perhaps be most readily explained by first stating briefly the general purpose and mode of operation of the entire apparatus, that is the inclination recording mechanism conjunctively with the azimuth recorder, in charting the true course followed by a well. The general mode of operation of the apparatus, including both the azimuth and inclination recorders, is to make a continuous record of the vertical deviation of the well, and the direction or bearing of the deviation, in a single lowering, or raising, of the apparatus within the well. The general characteristics of operation of the apparatus whereby a continuous record of the well course is made, may be described as comprising the charting of a continuous record of the degree of vertical inclination of the apparatus, and therefore the vertical deviation of the well, and simultaneously making a substantially continuous record of the horizontal angular bearing of the apparatus in azimuth. From these records, the true course of the well is determined by calculating the vertical deviation readings with reference to the readings in azimuth, in order to arrive at the bearing in azimuth, of the vertical deviation.

The inclination recording apparatus with which the present invention is primarily concerned, may be described generally as comprising means for resolving the degree of inclination into components, and recording these components in a manner such as to enable the readings to be interpolated or calculated to arrive at the inclination of the well at any point in its course.

In the hereinafter described preferred form of the invention, the inclination recording apparatus comprises a pair of marking arms so arranged as to record the right angle components of the vertical deviation, in combination with gravity operated means, such as a pendulum mounted for universal swinging movement, which imparts movement to the marking arm in accordance with the degree and direction of inclination of the apparatus. Preferably the marking arms are caused to register on separate charts or strips of recording tape, which are driven by a suitable motor to move past the stylus on the marking arms as the apparatus is moved through the well. After the survey of the well has been completed, the extent of the vertical deviation at any and all points in the well may be readily determined by simple calculations made from the recording strips. And as will hereinafter appear, the direction or azimuth bearing of the vertical inclination so determined, may be ascertained by calculating the position of the indicated vertical deviation with reference to the readings indicated by the azimuth recorder.

According to the preferred method of operating the apparatus, the latter is housed in a suitable casing secured to the lower end of a well pipe string, and intermittently lowered by adding successive lengths or stands of pipe at the ground level. It may be stated that by suspending and lowering the apparatus by means of a pipe string, there is afforded a most convenient and accurate means for measuring the vertical position of the apparatus within the well. In our present preferred embodiment of the invention, the recording mechanisms are controlled in their operation in accordance with the described procedure of lowering the apparatus in the well, that is, the recording devices are controlled so as to operate intermittently and during successive lowerings, the time period of each successive operation of the instrument being arbitrarily regulated in accordance with the time required to lower each pipe stand. As will later be noted, however, although the apparatus operates intermittently, continuous records are made of the course of its travel throughout the entire well.

In order to enable the apparatus to be started in its operation at the beginning of the lowering of successive pipe stands, or in fact at any desired point in the well, provision is made for controlling the starting of its operation by way of the pipe string. This is accomplished preferably and most easily by the use of inertia controlled means within the apparatus and which may be actuated to start the operation of the recording mechanism by imparting a certain movement to the pipe string. By virtue of this type of control, the starting of the recording mechanism on each of its intermittent operations at the beginning of the lowering of successive stands, may be effected by imparting such movement to the pipe string as is capable of actuating the inertia control. The recording mechanism then continues to operate while each stand is lowered, and thereafter automatically stops in a predetermined period of time, until again started as the next pipe stand is lowered. Thus from each intermittent recording made by the apparatus, the course of the well bore is determined throughout successive extents as the well pipe is lowered, and by combining these successive readings, the entire course of the well may be determined.

Having set forth the general features and characteristics of the invention, we shall now proceed to a detailed description of a typical form of apparatus representing a preferred embodiment of the invention. Reference will be had for purposes of description to the accompanying drawings, in which:

Fig. 1 shows an embodiment of our improved surveying apparatus suspended from drill pipe within a well casing, a portion of the outer casing of the apparatus being shown in section;

Fig. 4 is an enlarged medial section through the lower or guide end of the device below line 3—3 of Fig. 1, a portion of the vertical deviation recording mechanism being shown in section;

Fig. 5 is a fragmentary side elevation of the power unit and deviation recording mechanisms as viewed from the left on line 5—5 of Fig. 3; the casing being shown in medial section;

Fig. 6 is a section on line 6—6 of Fig. 5 showing the weighted starting lever in plan;

Fig. 7 is an enlarged plan view of the deviation recorder taken on line 7—7 of Fig. 3;

Fig. 7a is an enlarged section through one of the marking tables on line 7a—7a of Fig. 7;

Fig. 8 is a vertical section on line 8—8 of Fig. 7;

Fig. 9 is an enlarged perspective view of the tubular pendulum rider shown at A in Fig. 8;

Fig. 10 is an enlarged fragmentary view of the upper portion of the power unit as taken on line 10—10 of Fig. 3;

Fig. 10a is a fragmentary section on line 10a—10a of Fig. 10;

Fig. 11 is an enlarged sectional view on broken line 11—11 of Fig. 5;

Fig. 12 is a fragmentary enlargement of the showing of the compass needle and recording chart arrangement at the lower end of Fig. 2.

Fig. 13 is a fragmentary section on line 13—13 of Fig. 12;

Fig. 14 is similar to Fig. 12 except for the showing of a variational form of recording means;

Fig. 15 is a side elevation of the deviation recording mechanism shown in Fig. 8 as viewed from the right thereof, the outer casing being shown in section;

Fig. 16 is an enlarged fragmentary view of a portion of Fig. 2 as viewed from the position of line 16—16;

Fig. 17 is an enlarged horizontal section on line 17—17 of Fig. 2;

Fig. 18 is a horizontal section on line 18—18 of Fig. 2;

Fig. 19 is a diagrammatic illustration of the relative arrangement of the recording tables or platens in the deviation recorder;

Figure 2:
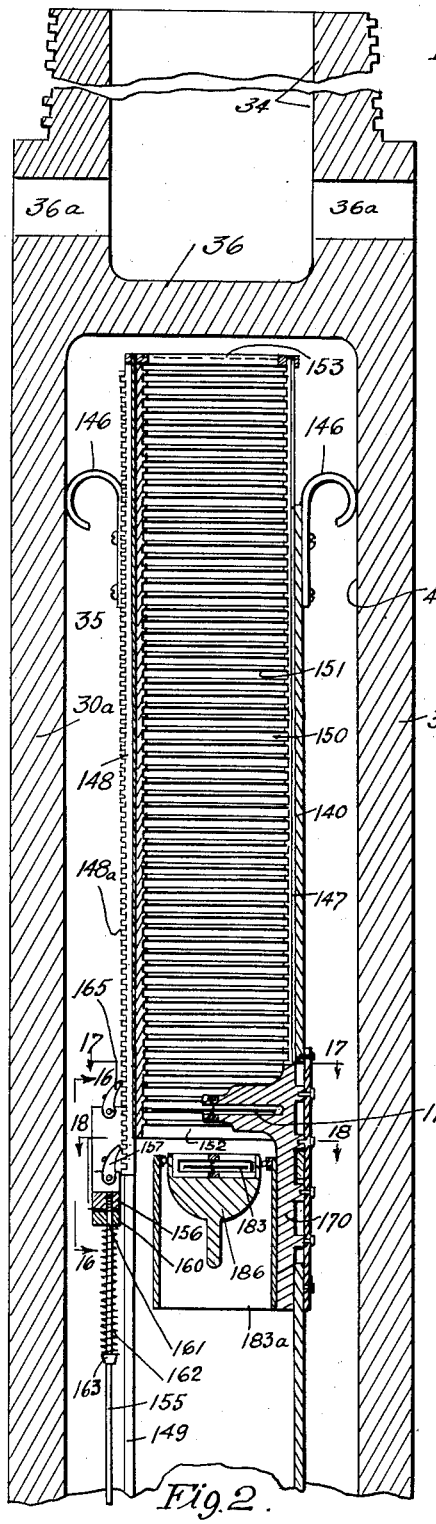
Fig. 2 is an enlarged medial section through the upper portion of the device to about line 2—2 of Fig. 1 and illustrating particularly the mechanism for recording its horizontal angular bearing.

Figs. 20 to 23, inclusive, illustrate diagrammatically the method of determining the direction of the right angle components of the vertical deviation with reference to the marking table arrangement shown in Fig. 19;

Fig. 24 is a diagram illustrating the method of calculating the resultants of the components as determined in Figs. 20 to 23;

Fig. 25 is an illustrative graph of a typical survey, plotted in plan or in a horizontal plane, showing the degree and direction of the vertical inclination as calculated intermittently according to the method illustrated in Fig. 24;

Fig. 26 is a graphic illustration on a reduced scale of the course of a well, obtained by projecting the true vertical deviation in an east-west vertical plane; and Fig. 27 is a graphic illustration similar to Fig. 26 of the vertical deviation of the well projected on a north-south vertical plane.

Referring first to Fig. 1, the surveying apparatus generally indicated at 301 is shown suspended within a well casing 31 by a usual tubular drill stem 32, the recording mechanisms of apparatus 30 being housed within a casing or instrument barrel 30 having an upper, tubular pin end 34 threaded into the lower end of the well pipe. The bore 35 of barrel 30 is closed off near its upper end by wall 36, and, if desired, radially extending circulation ports 36a may be provided through the sides of the barrel above wall 36, said ports opening into the bore 34a of pin 34.

In certain instances it is desirable to center the apparatus within the well or casing, and as a typical centering means, there is shown a plurality of bowed, radially resilient guides or arms 37 mounted on the lower guide end 30b of the barrel and with their bowed or convex portions adapted to engage the walls of the well bore or casing. While these may be in any suitable number, here we show four of these bowed, spring guides, equally angularly spaced about the barrel and anchored at both ends thereto.

Figure 3:
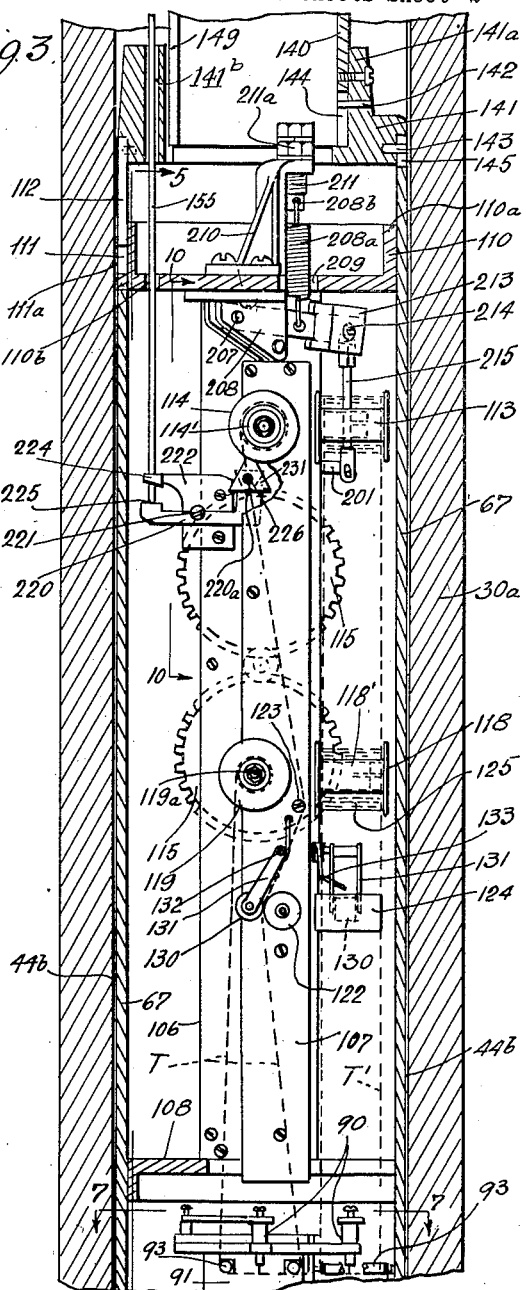
Fig. 3 is an enlarged medial section through an intermediate portion of the apparatus below the section illustrated in Fig. 2 and to about line 3—3 of Fig. 1, the power unit or clockwork mechanism being shown in elevation.

In order to facilitate correlating Figs. 2 to 4, the recording mechanisms within barrel 30 may be characterized with reference to Fig. 1 as comprising the upper orienting mechanism, generally indicated at 38, the lower vertical deviation recorder generally indicated at 39, and the power unit 40 interposed between the orienting and deviation recording mechanisms and by means of which these mechanisms are operated.

The instrument barrel 30 preferably is made in two sections, the upper section 30a being of comparatively greater length and housing the power unit and recording means, and the lower shorter section 30b serving as a guide end for the apparatus. In order to preclude the possibility of fluid leakage into the housing section 30a of the barrel with the attendant danger of damage to the contained mechanisms, a high pressure joint, generally indicated at 41, is provided between the barrel sections, the joint being of such a nature as to withstand effectively the high pressures existing in wells of considerable depth.

As shown particularly in Fig. 4, the joint parts comprise the upper pin end 43 of lower barrel section 30b, threaded into the downwardly opening counterbore 44 of upper barrel section 30a. Downwardly facing, annular shoulder 46 defines the upper end of counterbore 44, and the head or flange 47a of plug 47 fits nicely within bore 44 with head 47a seated against the shoulder 46. A reduced diameter, upstanding, annular flange 48 is formed on pin end 43 of barrel section 30b, this flange projecting upward within and being spaced from the sides of the annular recess 49 formed between the lower reduced portion 47b of the plug and the barrel wall. Packing washers 50 are placed within the recess 49 immediately beneath flange 47a and below the washers is inserted the annular gasket 51 appearing in section in the form of a double-lipped, inverted cup. Relatively hard washers 52 are placed within gasket 51 between lip portions 51a, 51b thereof, the end flange 48 on the lower barrel section bearing against these washers as the joint is taken up, compressing them longitudinally to hold the plug seated and to expand radially the described packing washers within the annular recess 49.

If it is desired, a suitable ring gasket 53 may be placed between the end of barrel section 30a and shoulder 54 on the lower section, to prevent fluid leakage through the threaded connection 41a of the joint. However, in case extremely high pressures are encountered, fluid leakage may occur upward between the joint threads and into the annular space 55 between flange 48 and the barrel wall, in which event the gasket lip 51a is expanded radially into tight engagement with the barrel wall, due to fluid pressure being exerted on the conical end face 29 of the gasket lip, thereby preventing leakage around the plug flange 47a. The plug 47 thus serves as a barrier against fluid leakage into the upper barrel interior, and gasket 51 as a seal against leakage around the plug.

In order to provide a double seal against such leakage, openings 56 are formed in flange 48, and through which openings the pressure is communicated to the space 57 between the plug and the upper closed end 58 of the lower barrel section. The inner gasket lip 51b similarly is forced by the pressure in space 57 acting on its conical end face 29, against reduced portion 47b of the plug to prevent fluid leakage therebetween. Due to the lip portions of the gasket 51 being relatively spread against the side walls of the recess 49, fluid leakage can occur only around the upper end of flange 48 and within the gasket, this obviously being of no consequence.

A cap or guide nose 60 is threaded on the lower end of the guide section 30b of the barrel, the cap preferably having a rounded surface 60a to facilitate movement of the apparatus past irregularities in the well, and also having a bottom opening 61 through which well fluid taken into the interior 62 of the lower barrel section by leakage through the cap joint 28 or the guide arm junctures, may drain as the apparatus is removed from the well.

Within bore portion 44a, immediately above counterbore 44, is a tubular supporting liner or spacer 63 resting on the plug 47. The upper portion 44b of the barrel bore is reduced in diameter with respect to portion 44a, a downwardly facing annular shoulder 64 being formed at the junction of bore portions 44a and 44b. Pendulum bearing plate 65, described more fully hereinafter, is clamped between shoulder 64 and the upper end of spacer 63, the latter, in turn, being held in clamping position by plug 47 through the packing assembly, flange 48 and threads 41a.

A second tubular liner 67, comprising a casing and support for the power unit and deviation recorder to be hereinafter described, is inserted in bore portion 44b and fits over the reduced portion 65a of the pendulum bearing plate 65 to which it is attached by screw 27, the lower end of the tube 67 being slotted as at 68 to fit down over the head of screw or key 69 located at a predetermined point in the side of the bearing plate thus establishing the angular position of tube 67 and its contained power unit with relation to the supporting plate 65 and the deviation recording mechanism.

A central opening 70 (Fig. 8) is formed through plate 65, and within the recessed sides 70a of the opening is a ball race 71 upon which the pendulum 72 is supported for universal swinging movement. The pendulum comprises a stem 73 carrying a detachable weight 74 at its lower end and having a spherical enlargement 75 resting on bearings 71. By virtue of the described mounting of the pendulum, the latter is enabled to swing relative to the barrel in any horizontal direction and with minimum frictional resistance offered to such swinging. The spherical head 75 is confined within its seat in ballrace 71 by the cover plates 77 and 77a which has central opening 78 to permit of passing pendulum stem 87 therethrough.

An arm supporting structure 79 in the form of a square block is held by screws 79a to plate 77, these screws also holding a top plate 80 to the block. Block 79 and plate 80 have central openings 81 in axial alinement with openings 70 and 78. A pair of marking arms 82 and 83 extending horizontally at right angles with each other in a common plane, are connected by a mortise at their centers and at a point in vertical alinement with the pendulum when the apparatus is in true normal position, the arms projecting with sliding fit through horizontally extending notches 84 formed in opposite sides of the support 79 (Figs. 8 and 15). It will be noted that the notches have considerable horizontal extent, as viewed in Fig. 15, and that their tops are closed by plate 80. The arms thus form a cross (see Fig. 9) which has bodily slidable limited displacements in all directions within a horizontal plane. Soldered or otherwise attached to and depending from the cross, is a tubular pendulum rider 86, the rider and cross being centered with one another and the arms being taken in notches 85 formed in the upper end of the rider tube. Connection between the marking arms and the pendulum is made by way of the rider 86 and an upper axial alined extension 87 of the pendulum stem, the extension carrying a terminal spherical knob 88 having a sliding fit within rider 86. Thus it will be noted that by virtue of the capability of the knob 88 for longitudinal movement within the tubular rider, a lost motion connection is provided whereby the vertical component of the relative movement of the pendulum and cross arms is dissipated, and whereby the horizontal component of such movement is represented by effective horizontal movement of the marking arms.

On one end of each of the arms 82, 83 is mounted a suitable marking pencil or stylus generally indicated at 90, the points P, P' of the marking pencils being adapted to move horizontally above their respective marking tables or platens 91, 92, which are held to plate 77 by screws 77a, dowels 77b further positioning the tubes. It may be mentioned at this point that the tables are relatively arranged so that their projected longitudinal axes B and C (Fig. 7) intersect at right angles. When the apparatus is in true vertical position, the marking pencils are positioned directly on such axes of their respective table. Near the ends of each table or platen 91, 92 is mounted a transversely arranged roller 93, and recording tapes T and T', preferably in the form of paper strips of predetermined width, extend beneath the rollers and across the surface of their respective tables. Any suitable provision may be made for maintaining the recording tapes in exact central positions on the tables, that is for maintaining the longitudinal center lines of the tapes in coincidence with the center lines B and C of their respective tables and with the normal positions of the marking pencils, the tapes being shown herein to be confined centrally on the depressed table tops 91a, (Fig. 7a) between the raised sides 25 in which the rollers 93 are mounted.

In order to maintain the marking arm cross in such predetermined position when the apparatus is truly vertical that the marking pencils will lie on the center lines of the tapes, and in order to prevent lateral turning or rotative movement of the cross and thus maintain the arms always at right angles with the longitudinal axes of their respective tables, movement of the cross is controlled by a parallel movement linkage generally indicated at 95. The linkage comprises two pairs of equi-length parallel bars or links 96 and 97, the pairs normally being at right angles and bars 96 being pivotally secured at their one ends to plate 80 as at 98, pivots 98 being spaced equally from projected axis B. Bars 97 are pivotally connected at one end to arm 82 at opposite sides of the cross center by means of pins 99 extending upwardly through said arm and a spacer 100 which overlies said arm, keeper pins 101 extending through pins 99 above the links. At their other ends, each pair of links is pivoted at 96a, 96b, to disk 102 which serves as a common swivel point for the links, the disk having supports or feet 103, see Fig. 15, which slide freely on plate 80. Thus it will be readily understood that by virtue of the parallel movement linkage, the marking ends of the arms are maintained in the predetermined positions above the tables 91 and 92, illustrated in Fig. 7, as long as the instrument is truly vertical and the vertical axes of the pendulum and cross are coincident, and that during movement of the arms caused by swinging of the pendulum, said arms remain at right angles to their respective tables and, in their changed positions, for instance the positions indicated by the dotted lines 95a (Fig. 7) are parallel with their respective normal positions.

Although any suitable power unit or driving means for the recording devices may be used, the power unit is shown typically and preferably in the form of a clockworks mechanism generally designated at 40. It may be stated that the power unit is subject to adjustment in order that its operating speed may be varied in accordance with the requirements of particular operating conditions, the mechanism also being capable of control whereby it may be automatically stopped and started at predetermined intervals. The various parts embodied in the power unit are mounted on a frame comprising a pair of parallel vertical plates 105, 106 held in spaced relation by spacers 105a, while an angle plate 107 (Fig. 6) is held by spacers 107a to plate 106 with the leg of 107b of the angle plate parallel with and spaced from plate 106. A stand ring 108 is secured to the lower end of the frame by angle 24, see Fig. 5, and has a close sliding fit within the tubular liner 67. The stand serves both to position the lower end of the frame in liner 67 and to act as a rest for the power unit when the latter is removed from the liner.

The frame members 105, 106 are joined at their upper ends by angles 103 (Figs. 5 and 10) to the underside of the cup shaped plate 110, the latter carrying a screw 111 whose head 111a provides a projection beyond the outer periphery of the cap flange 110a and rests in the bottom of a vertical slot 112 in the upper end of the liner 67. The cap 110 thus serves as a suspension support for the power unit, the position of the latter relative to liner 67 being predetermined by the location and depth of slot 112, which location in the present instance may be in vertical alinement with slot 68 at the bottom of the liner and registers with screw head 69 to establish the relative positions of the liner and the deviation recording mechanism 39. By virtue of the screw heads 111a, 69 registering in their respective slots, the power unit and recording device 39 are thus arranged in predetermined relative horizontal angular positions.

A pair of winding reels 113, 114 are mounted at the upper end of the angle frame member 107, the drive shafts 113a, 114a of the reels extending horizontally at right angles to one another, one through each of the legs of angle plate 107. The winding reels are driven at the same predetermined speed by the conventionally illustrated mainspring barrels 115 through gear train 227, 228, 229, see Fig. 10, shaft 116 and the bevel gear train generally indicated at 117. The spring barrel gears 115b are controlled so as to operate together by the interposed gear 24a. Below the winding reels are located the recording tape supply reels 118, 119, from which the tapes T' and T are supplied for the marking tables 92 and 91, respectively, these supply reels being carried on stationary shafts 118a and 119a mounted at right angles in the frame angle member 107. As shown in Figure 3 the tape T from supply reel 119 extends across table 91 beneath the rollers 93, then passes upwardly around one side of the driving roll 122, and thence around a guide pin 123 on plate 107 to the winding reel 114. Similarly, the tape T' from supply reel 118 passes downwardly and across the top of table 92 beneath rollers 93, then upwardly around one side of the driving roll 124, and finally around guide pin 125 to the winding or take-up spool 113. The tape drive rolls 122 and 124 are keyed on right angle shafts 122a, 124a, which are mounted relatively at right angles in the frame member 107 similar to shafts 113a and 114a, and are rotated at the same predetermined speed through gear train 115b, 23, 22, shaft 127, and the bevel gear train at 128 (see Fig. 5). The tapes are moved across their respective marking tables at a constant speed by virtue of their frictional engagement with the driving rolls 122, 124, the latter preferably being formed of rubber or similar material. The tapes are pressed into frictional engagement with the driving rolls by means of pressure rollers 130 mounted on swinging arms 131 pivoted at 132 on the angle plate, the rollers being urged against the tape and towards the driving rolls by means of springs 133.

As shown in Figure 10, a suitable clutch device is interposed between each of the take-up or winding spools and its respective drive shaft, whereby the tapes may be continuously maintained under only predetermined tension by allowing for slippage between the spools and their drive shafts. The drive shafts have such angular velocity that they will always frictionally drive the spools fast enough to take up the tape fed by rolls 122, 124, while slippage between the spools and their shafts occur as the effective diameter of the spools increases due to tape accumulation thereon. A hub 135 upon which the spool 113 is non-rotatably carried, is rotatably mounted on the drive shaft 113a, and confined thereon by washer 20 held in place on the end of the shaft in the hub counterbore 135a by screw 20a, the shaft having an integral annular flange 136 spaced somewhat from the opposing end of the hub 135. A spring 137 is mounted on the inner end of the hub and bears against the shaft flange 136 with such force that normally, that is without appreciable resistance to the rotation of the spool, the hub 135 is forced into endwise engagement with washer 20 so as to cause the hub to rotate with and at the same speed as the drive shaft. Upon resistance to the rotation of the spool, and therefore hub 135 upon which it is non-rotatably secured, a certain amount of slippage occurs between the spring 137 and the shaft flange, whereby the spool is enabled to rotate at a speed less than that of the shaft and in accordance with the resistance, which in this case is set up by the tension of the tape.

Winding spool 114 is provided with a similar clutch device, as illustrated conventionally at 114' (Fig. 3). The tape supply spools 118, 119, are also provided with similar clutches, shown conventionally at 118' (Fig. 3) and 119' (Fig. 5), respectively, though clutches 118' and 119' serve essentially as drags to resist "spinning" of the spools about their stationary shafts 118a, 119a and thus maintain proper "back tension" on the recording tapes, to obvious advantage. Thus in the tape movement, the driving rolls 122, 124 are rotated at a predetermined rate of speed in accordance with the desired rate of travel or feed of the tapes. The winding spool shafts 113a, 114a, however, preferably are rotated at a slightly higher speed in order to tension the recording tapes, the resistance to the turning of the take-up spools as a result of the tape tension being sufficient to cause relative slippage between the spools and their drive shafts, and thereby preventing the tapes from pulling apart.

The horizontal direction of the vertical inclination of the well is determined by successively recording the bearing of the apparatus in azimuth by the mechanism in the upper portion of the instrument generally indicated at 38 in Figure 1. Referring particularly to Figs. 2 and 3, the tubular casing 140 is supported and centered at its lower end in a socket 141a of cap 141 mounted on the upper end of the liner 67, the relative positions of the casing, socket and liner being determined by pins 142 and 143 projecting from the cap into slots 144 and 145 in the lower and upper ends of the casing and liner, respectively. The upper end of cylindric casing 140 is centered within the bore 44b of the barrel 30a by means of bowed, spring guides 146 mounted on opposite sides of the casing and adapted to engage the bore wall.

A chart carrying tube 147 is adapted to slide vertically through tube 140, there being secured to one side of the tube a rack 148 which extends radially outwardly through a slot or longitudinal opening 149 formed by parting the casing 140 along one side throughout its length. Slot 149 accommodates vertical travel of the rack during vertical reciprocation of the chart carrying tube. Within tube 147 is a tubular chart 150 having internal annular corrugations 151 spaced equally at predetermined intervals longitudinally thereof, the latter being held against longitudinal movement with respect to tube 147 by the chart locating ring 152 at the bottom of the tube and at its upper end by a removable cup shaped ring 153 slipped over the ends of the tube and chart. It may be mentioned at this point that in the operation of recording on the chart 150, the latter is adapted to be intermittently moved vertically by tube 140 and preferably in an upward direction, although insofar as the characteristics of operation and recording on the chart is concerned, it is immaterial whether the chart be moved up or down.

Vertical movement of the chart and chart carrying tube assembly within casing 140 is accomplished by way of the push rod 155 which extends downward through openings 141b and 110b (Fig. 3) in the casing socket 141 and the power unit suspension plate 110, respectively, the push rod being adapted to be intermittently moved upwardly a predetermined distance by the power unit as will be hereinafter explained. The push rod 155 carries on its upper end a head 156 upon which is pivotally mounted the rack actuating pawl 157, the latter being retained in ratchet engagement with the rack teeth 148a by spring 158, see Figure 16. The head 156 is confined for vertical reciprocating movement in a suitable frame 160 mounted on the side of the casing 140, the push rod extending through an opening 161 in the bottom of the frame. The push rod is urged downwardly to its lowermost position in which the head engages the bottom of the frame as shown in Figure 2, by means of a coil spring 162, confined on the rod between the frame and an abutment 163. The push rod is adapted to be moved intermittently upwardly a distance corresponding to the pitch of the teeth 148a on the rack, and by virtue of the engagement of pawl 157 with the rack, the corrugated chart 150 is caused to be intermittently raised a distance in accordance with the length of travel of the push rod. Downward movement of the chart after each successive upward movement is prevented by means of a retaining dog or pawl 165 mounted on pivot 166 on the upper end of the frame 160, the dog being urged into constant engagement with the rack teeth by spring 167.

In the present instance, the pitch of the teeth 148a is half the distance between adjacent corrugations 151 on the chart, and therefore in order to move the chart upward a distance corresponding to the spacing between corrugations, the push rod must move upwardly twice and the pawl 157 therefore successively engage two adjacent rack teeth. It will be understood that the described relationships between the push rod travel and the spacing between chart corrugations may be varied under certain circumstances, for instance, it may be desirable that the chart in each of its movements be raised the distance between adjacent corrugations, in which event the push rod 155 would be caused to move a corresponding distance. In such case, the pitch of teeth 148a may be made equal to the chart corrugation spacing.

The horizontal angular bearing indicating and marking means by which readings are intermittently recorded on the chart may be characterized generally as comprising a horizontally swinging member, and preferably a compass needle pivotally mounted at the axial center of the chart, the outer end of the needle being adapted to intermittently engage the chart corrugations. Due to there being imparted to the chart a predetermined longitudinal movement for each successive recording by the marking or compass needle, it is desirable that the latter, for all positions of inclination of the apparatus, swing in a plane normal to the longitudinal axis of the chart. However, due to the required sensitiveness of the marking needle, inclination of the apparatus beyond a certain degree causes bearing friction to develop in the needle mounting to such an extent as to somewhat restrict the movement of the needle and prevent its assuming a strictly accurate position. Provision may be made by well known means for mounting the marking needle so as to enable it to always swing in a horizontal plane regardless of the inclination of the apparatus, the disadvantages in this case, however, being that due to the variations of inclination, a constant relative movement between the chart and needle for each successive movement of the chart may not be obtained, and which is necessary due to the equal spacing of the chart corrugations; and that by permitting relative vertical movement between the chart and needle, the latter may be disturbed unduly as it is engaged by the chart. In accordance with the invention, the above objectionable features are entirely overcome by the provision of a pair of magnetic needles mounted in tandem arrangement, one of the needles, having a comparatively stronger directive force, being carried in a mounting whereby it is maintained at all times in a true horizontal position, and thereby enabled to freely orient itself with the earth's magnetic flux. The other needle, that is the recording or marking needle and which preferably has a comparatively less directive force, is mounted in vertical alinement with the other direction seeking needle, and in bearings whereby it is maintained for movement in a plane normal to the chart. By virtue of its attraction for the marking needle, the comparatively stronger direction seeking needle serves at all times to orient the other with its own magnetic field, and therefore, in alinement with the earth's magnetic field, although the polarity of the marking needle is reversed due to its being positioned by the direction seeking needle. Thus upon inclination of the apparatus to a degree that normally would prevent the marking needle from assuming a true position due to bearing friction, the stronger needle serves, by virtue of its attraction, to overcome the bearing friction in the marking needle and to aline it in true orientation with the earth's field.

A preferred form of means for indicating the horizontal angular bearing of the apparatus and for recording the bearing on the corrugations of chart 150 is shown in detail in Fig. 12. A supporting bracket comprising a vertical plate 170 is inserted within the chart casing through a vertical slot 171 formed therein, the bracket being supported as at 172 from a plate 173 secured to the outer face of the casing and bridging slot 171. The chart and the chart carrying tube 147 are parted throughout their length along one side as at 174 to clear the bracket 170 and to permit their vertical movement relative to the bracket when acuated as previously described. By virtue of its projection through the longitudinal space or slot 174, the bracket thus serves, in effect, as a key to prevent axial turning of the chart and the chart carrying tube within the outer casing.

The bracket is shaped at its upper ends to provide a pair of vertically spaced and radially inward extending arms 175, 175a, between which recording or marking compass needle 176 is mounted in bearings 177 at the axial center of the tubular chart, the length of the compass needle being slightly less than the diameter D (Fig. 17) of the inner periphery of the chart corrugations 151. The compass needle 176 carries on one end a relatively flexible marking means, for instance a fine wire or bristle 179 which normally projects beyond the inner periphery of the corrugations and into the space 180 between adjacent corrugations as illustrated by the position of a similar marking compass needle 192 in Fig. 14. Normally, that is, between intermittent upward movement of the chart, the marking bristle is disengaged from the chart, the needle being in an intermediate position between chart corrugations and therefore being free to orient itself to a true north and south position. Upon upward movement of the chart, the bristle, by virtue of its radial extent beyond the inner periphery of the corrugations, is engaged and deflected upwardly thereby as shown in Fig. 12. By smoking or otherwise suitably coating the inner surface of the chart, a mark or scratch is recorded on successive corrugations by the bristle in accordance with the relative position of the compass needle, the markings appearing on the corrugations in the form of vertical lines as indicated at 182. Due to the provision of a relatively flexible bristle for recording the position of the needle, the stability and bearing of the latter are but slightly affected upon engagement of the bristle by the chart, and therefore an accurate reading of the bearing of the apparatus in azimuth is obtained.

In order to stabilize the recording compass needle and to enable it to assume a true bearing when the apparatus is tilted to such a degree that normally the friction in the needle bearings would prevent its correct orientation, there is provided a second direction seeking magnetic needle 183 having a comparatively stronger directive force, and which is adapted by its attraction for the marking needle to sensitize and stabilize the latter. The magnetic needle 183 is carried on a pendulum 186 supported within a gimbal mounting including a tubular casing 183a secured to the lower portion of bracket 170, and within the upper end of which a ring 184 is pivotally mounted at diametrically opposite points 185 (see Fig. 18) to swing about axis R—R. The pendulum 186 in turn is pivotally mounted at 187 at opposite sides of ring 184 to swing about axis S—S, the ring diameters through the opposed pairs of pivot points 185 and 187, intersecting at right angles. The bearings of the lower needle 188 are located in the upper end of the pendulum in vertical alinement with the recording needle bearings, and it may be mentioned that preferably the needles are located as close together as practical in order to utilize the maximum directive force of the lower and more highly magnetic needle.

It will be noted that the needle 183 is not affected by bearing friction when the apparatus is tilted, since the pendulum remains at all times in a true vertical position, and as a result this needle serves to accurately orient the recording needle with the earth's flux regardless of the inclination of the apparatus. It is within the scope of the invention to employ only a single compass marking needle of the nature described, since as mentioned, the single needle will record accurately up to a certain degree of inclination of the apparatus. However, in order to assure that proper orientation of the marking needle will be had regardless of the inclination of the apparatus, it is preferred that the marking needle be directed in its movement by the comparatively stronger direction seeking needle, accuracy of which is unaffected by the inclination.

In Figure 14 a variational form of recording needle combination is illustrated, in which the lower magnetic needle is replaced by a gravity controlled recorder comprising an arm 189 pivotally mounted in bearings 190 in the vertically spaced bracket arms 191, 191a and located at the axial center of the chart. The mounting and operation of the upper recording compass needle 192 is similar to the needle 176 in the previously described form. Arm 189 carries a weight 193 at its outer end, and projecting beyond the weight is a pair of horizontally spaced bristles 194 which are adapted to mark on the chart corrugations upon vertical movement of the chart, in a manner similar to the described operation of recording by the compass needle. When the angle of inclination of the apparatus is such that the upper magnetic needle 192 is prevented (due to bearing friction) from alining itself accurately with the lines of force in the earth's field, the horizontal angular bearing of the apparatus may be recorded by the gravity indicator. Since the arm 189 is weighted at its outer, free end, said free end tends to assume the lowest point of its circle of travel upon inclination of the apparatus, and by predetermining the vertical angle at which the compass needle ceases to record accurately, the markings made by the gravity indicator bristles 194 may be read from that point on, and the horizontal angular bearing of the apparatus computed from the chart and type records together, as will later be understood. Since the true bearing of the apparatus is indicated by the compass needle markings up to the point where the needle may cease to function with strict accuracy, the true bearing of the apparatus as indicated by the gravity lever markings may be accurately determined by reading the angular position of the latter with reference to any one of the markings of the compass needle made within its range of accuracy. The markings on the chart corrugations made by the gravity indicator are distinguished from those of the compass needle by the pairs of closely spaced vertical lines 196, the needle markings appearing as in the previous instance, as single lines 182.

As previously mentioned, the apparatus finds its most general adaptation in the surveying of wells by intermittently lowering the apparatus as successive lengths or stands are added to the well pipe at the ground level. It will be understood that in its broader aspects the invention is not limited to use in combination with this particular form of suspension means, namely, a pipe string by the use of which the lowering is necessarily intermittent due to the necessity for adding successive pipe stands, but that in certain instances it may be desirable to suspend and lower the instrument continuously, that is, without intermittent stops, by means of a flat tape or cable. Under these latter circumstances, the power unit may be caused to operate continuously to drive the recording tapes and to move the azimuth recording chart vertically at predetermined time intervals.

In order to adapt the apparatus to the preferred method of surveying the well by intermittently lowering the apparatus on a pipe string, provision is made for controlling the operation of the power unit by way of the suspension means, (the pipe string) and for this purpose it is preferred to use an inertia control means which may be actuated intermittently to start the operation of the power unit by imparting a certain movement to the pipe string. Although various forms of inertia control means may be provided for controlling the operation of the power unit, there is shown herein a typical and preferred form of such control whereby the operation of the recording means from the power unit may be started at any point, or any successive predetermined points during the lowering of the apparatus within the well, by vertical movement of the apparatus by way of the pipe string.

The inertia control mechanism generally indicated at 200 (Fig. 11) at the upper end of the power unit, embodies a vertically oscillatory or rocking control lever 201 pivotally mounted at 202 on the inner side of the vertical frame member 105, the control lever having an integral pawl arm 203 adapted to be intermittently brought into and out of engagement with a pin 204 on the side of gear wheel 205 to stop and start the operation of the power unit, as will hereinafter appear. Wheel 205 is mounted on the winding spool drive shaft 116, and is geared to main-spring barrels 115, to the gear trains through which the tape drive rolls are actuated, and as will later be seen to the chart actuation mechanism, the operation of the entire unit therefore being controllable by the starting and stopping of wheel 205. A starter lever 206 is pivotally mounted at 207 in a bracket 208 mounted on the under side of the suspension plate 110, and is normally supported intermediate its ends in a raised vertical position by means of a coil spring 208a (Fig. 3) extending through an opening 209 in plate 110 and hooked at its upper end 208b into the vertical adjustable screw 211 which is threaded through the upper arm portion 210a of a spring bracket 210 mounted on the upper side of plate 110. The tension of spring 208a is regulated by adjusting screw 211, as will be readily understood, a lock nut 211a being utilized to lock the screw in adjusted position.

The starting lever 206 carries a weight 213 near its outer end, which weight may be adjusted longitudinally of the lever and set in adjusted position by screw 214. The outer ends of the starter and control levers 206 and 201 are interconnected by means of a link rod 215, the latter having a pivotal and lost motion connection at 216 with the control lever, and having a clevis 215a at its upper end pivotally connected at 217 with the starter arm. The pawl arm 203 is urged to swing in a clockwise direction, as viewed in Fig. 11, about pivot 202 and into the path of pin 204 by means of a spring 218 bearing against the outer edge 203 of the arm.

A horizontally extending and vertically oscillatory push rod lever 220 is pivotally mounted at 221 on bracket 222 secured at 223 to the outer side of the frame member 106, the bracket having a vertical guide opening 224 in its outer end and through which the previously described push rod 155 extends. The lower end of rod 155 rests on the outer end of lever 220 at 225. Mounted on a shaft 226, which is driven by the upper spring drum 115 through gear 227, and from which shaft 116 is driven by way of gears 228 and 229, is a pair of triangular cams 230 and 231, the former being adapted to engage and operate the lever 201, and cam 231 to actuate lever 220 and push rod 155. It may be mentioned at this point that the starter lever 206 serves essentially to actuate the control lever 201 through the connecting link 215, to release gear 205 for rotative movement and to permit the power unit to operate a predetermined length of time during which a single movement is imparted to the recording chart 150 and the tapes are caused to move certain predetermined distance.

A cycle of operation of the power unit may be described assuming first that the parts are in the positions shown in Fig. 11, and in which the clock mechanism is prevented from running due to the engagement of pin 204 by the pawl arm 203. In order to start the drive mechanism, the apparatus is lowered fairly rapidly and suddenly stopped, whereupon the counter weight 213, by virtue of its inertia, tends to continue in its downward movement against the resistance of spring 208a, and in so doing, moves rod 215 downwardly to swing the control lever 201 and pawl 203 in a counter clockwise direction to release pin 204, whereupon the gear trains are freed so spring bands 15 may set the various gear trains in motion. The starter lever thereafter is returned to its normal upper position by the action of spring 208a, the lost motion pivotal connection 216 between the control arm and the link rod 215 permitting upward relative movement of the latter.

With the apparatus lowered on the end of a pipe string, the described starting operation is accomplished by permitting the pipe string to drop quickly a short distance, and thereafter bringing it to a sudden stop, after which weight 213, due to its inertia continues downward to trip the starter lever.

Upon starting of the power unit the recording tapes T and T' are moved across their respective marking tables and wound upon reels 113, 114 at a predetermined rate of speed. As mentioned hereinabove, at the start of each successive upward movement of the azimuth recording chart 150, the position of the chart relative to the marking compass needle 176 is such that the latter may swing freely between the corrugations 151, thereby enabling the needle to orient itself with the earth's magnetic field before a reading is taken.

The particular gear ratios in the clock works mechanism is such that during each time interval of operation of the power unit, gear 205 makes two complete revolutions, and therefore it is necessary that at the end of its first revolution, pawl arm 203 be swung outward to permit the gear pin 204 to pass. As shown in Fig. 11, upon rotation of triangular cam 230 in a counter-clockwise direction, one of the corners 230a of the cam is brought into engagement with the end 201a of the control lever, thereby rocking the lever and swinging pawl 203 out of the path of pin 204 to permit rotation of wheel 205. It will be noted that the cams 230 and 231 are relatively positioned on shaft 226 to space their effective corners 60° apart, and that at the point at which cam 230 swings the control lever as described, one of the corners of cam 231 is brought into engagement with the inner end 220a of the push rod lever 220, whereupon the latter is caused to swing about pivot 221 in a counter-clockwise direction to raise the pushrod 155. And it may be mentioned that the size of cam 231 and therefore the degree of movement of lever 220, may be predetermined to impart to the push rod a length of movement whereby the tubular chart 150 is moved upwardly any fraction of the distance corresponding to the spacing between corrugations, or the entire distance, as hereinabove described.

Upon engagement of the push rod lever 220 by the cam 231, the push rod 155 and the corrugated chart are moved upward a distance such as to cause one of the corrugations 151 to move past the marking needle, whereupon a vertical mark 182 is registered on the corrugation. The relative speeds of rotation of the shafts 116 and 226 being such that the gear wheel 205 makes two complete revolutions during one-third revolution of the cam shaft, when the push rod lever actuating cam 231 is moved from the dotted line position in Fig. 11 to the point at which the end 220a of the lever is moved to its lowermost position, that is the point at which one of the corners of the cam is vertically below the shaft 226, the wheel 205 has completed one revolution and pin 204 is at its starting point. Cam 230 being mounted on a shaft at an angle of 60° relative to cam 231, however, at the point at which the wheel 205 has completed one revolution, cam 230 has moved through one-sixth revolution and to a point at which the pawl 203 is swung from the path of pin 204, thereby permitting wheel 205 to continue on a second revolution. Upon a subsequent one-sixth revolution of the cam shaft, the cams being rotated to a position corresponding to that in Fig. 11, the push rod lever 220 is returned to its original position by the action of spring 162 in moving the push rod downwardly. Simultaneously, cam 230 moves to permit the operating lever and the pawl arm 203 to be swung into counter-clockwise direction by the action of spring 218, to their original positions, and at the end of the second revolution of wheel 205, pin 204 is again engaged by the pawl, thereby stopping the operation of the power unit.

The time interval during which the power unit operates after the starting jounce given the drill pipe and during its steady lowering, may be governed in accordance with the usual time required to lower a single pipe stand, the interval of operation allowed usually being somewhat in excess of that required to lower the stand, in order that it will be assured that a complete record of the vertical deviation will be recorded on the marking tapes covering the entire length of travel of the apparatus during the lowering of the stand. Thus it will be noted that although the pipe string is lowered intermittently, and intermittent movement of the recording tapes takes place accordingly, a continuous record of the vertical deviation of the well is obtained. Due to the fact that the direction of the vertical deviation usually does not vary appreciably during comparatively short distances in the well, it may be unnecessary to record the azimuth bearing of the deviation during the lowering of each successive pipe stand, although the operation of the azimuth recording mechanism 38 may be controlled so as to record the bearing in any desired successive intervals. In the present instance, due to the fact that the push rod 155 must be actuated twice in order to cause each successive chart corrugation to move past the marking needle, the bearing of the apparatus in azimuth is recorded only during the lowering of alternate stands. However, it will be readily apparent that by regulating the movement of the push rod, any desired length of travel may be given the chart for each operation of the power unit, thereby controlling the frequency with which the bearing readings are recorded on the chart.

In assembling the apparatus, the power unit is lowered within the supporting liner 67, a handle 240 being secured to the upper side of the suspension plate 110 for this purpose, until further downward movement of the unit is prevented by engagement of screw head 111a with the bottom of slot 112. The socket 141 within which is secured the chart casing tube 140, is then placed in position on the upper end of the liner 67, and the parts assembled thus far inserted within the upper barrel section 30a. Pendulum bearing plate 65 carrying the deviation recording mechanism is then inserted in bore 44a, the positioning screw 69 being fitted into slot 68, and thereafter the supporting liner 63 and plug 47 are inserted at the lower end of the upper barrel section. After locating the parts in the high pressure joint 41 as previously described, the barrel section 30b then is threaded into the lower end of the upper section, and the joint 41 taken up.

The method of calculating the readings on the recording tapes T and T' indicating the vertical inclination of the apparatus, is diagrammatically illustrated in Figs. 19 to 24 inclusive. Referring first to Figure 19, the relative positions of the marking tables or platens 91, 92 on bearing plate cover 77 are diagrammatically illustrated with reference to the point O, at the center of plate 77, point O representing the center of the marking-arm cross when in vertical alinement with the pendulum. As previously mentioned, the center lines B and C of the platens, which are coincidental with the center lines of the tapes, extend relatively at right angles, the points P and P' indicating the normal positions of the marking pencils, lying respectively on the center lines C and B. If, during the lowering of a pipe stand, the apparatus travels in a true vertical path, the curves traced by the marking pencils on their respective tapes will, of course, appear as straight lines coincidental with the center lines of the tapes. Upon inclination of the apparatus from the vertical, which obviously would result from vertical deviation of the well bore, curves will be traced on the recording tapes to one side or the other of their center lines in accordance with the degree and direction of the vertical deviation. Due to the fact that the vertical deviation generally is gradual, it will suffice to calculate the degree and direction thereof at suitable intervals, for instance at points on the curves coresponding to the positions of the apparatus at the end of the lowering of each successive stand, although the curves on the tapes, of course, indicate the entire path followed by the apparatus throughout its lowering. The degree and direction of the vertical deviation is found from the positions of the marking pencils as determined from the curves, with reference to the center lines C and B according to the method diagrammatically illustrated in Figures 20 to 23. Generally speaking, the method comprises the resolving of the right angular components of the deviation into a resultant which indicates the direction of inclination of the entire apparatus and, therefore, the well. Assuming that at corresponding points recorded on the curves of the two tapes, the positions of the marking pencils lie to the right of line C and above line B, which in a coordinate system may be taken as the Y and X axes, respectively, the resultant $R_3$ of the right angular components of the deviation as measured by the distances of points $P'_3$, $P_3$ (Fig. 20) from the tape center lines and in the coordinate system on the X and Y axes, will lie in the third quadrant, the starting point of angular measurement being from a line O S normal to the center line of table 92 and coincidental with the Y axis. The point S may be considered as a point on the plate 77 in vertical alinement with the longitudinal slot 174 in the orientation recording chart 150 and as will later be noted, the orientation readings on the corrugated chart are likewise reckoned with reference to slot 174, the latter thus serving as a common basis from which the angular measurements in both systems are taken. As shown in Figures 21 and 22, with points $P_1$ and $P_2$ lying to the left of the center line of table 91, or to the left of the Y axis, and with points $P'_1$ and $P'_2$ lying below and above the X axis, the component resultants R and $R_3$ lie respectively in the first and second quadrants. Similarly with points $P_4$ and $P'_4$ lying respectively to the right of the Y axis and below the X axis, the resultant $R_4$ direction of the vertical deviation is in the fourth quadrant.

The method of determining the degree of the angles of deflection will be apparent from Figure 24. As a matter of convenience, it may be desirable to measure the X and Y components by determining the distances of the marking pencil points from the edges of the tapes instead of measuring from their center lines, measurements in this case being taken from the inner sides of the tapes intersecting at the point Z. Thus assuming, for instance, that the horizontal direction of the vertical deviation of the apparatus lies in the first quadrant, the tangent of the angle of the resultant $R_1$ with the reference line through point S, which is the Y axis, may be determined from the ratio $$\frac{ZP_1}{XP'}$$

Similarly the bearing of the resultant $R_2$ with relation to the reference line, may be determined by adding to 90° the angle between $R_2$ and X axis. The total horizontal angles of the resultants in the third and fourth quadrants may be determined similarly by adding to the calculated angles, 180 and 270°, respectively.

In order to determine the bearing of the markings on the corrugated chart with reference to the slot 174, the chart may be removed from tube 147 and spread flat. The inner peripheral diameter of the corrugations being known, the angular positions of the markings with reference to slot 174 in a counter-clockwise direction, as viewed in plan, may be determined by measuring along the corrugations from the markings to the edge 150a of the chart. Having thus established for each successive marking on the corrugations the horizontal angular bearing of slot 174 with reference to the marking, and in so doing having established the bearing in azimuth of the point S, the true bearings in azimuth of the resultants $R_1$, $R_2$, etc., is determined by adding to the angular bearing of point S, the deflection angles DEF₁, DEF₂, etc.

With the bearing of the angles of the vertical deviation of the apparatus established at predetermined intervals in the lowering of the instrument, a curve showing the course of the well in plan may be made by plotting the resultants of successive readings of the vertical deviation with reference to the compass bearing, as illustrated in Figure 25. Since in the present case the readings in azimuth are recorded on the corrugated chart during the lowering of alternate pipe stands, the resultants or segments in the plan curve represent the vertical deviation of the well during corresponding intervals. As shown in Figures 26 and 27, the vertical course followed by the well may be illustrated by plotting at successive vertical intervals corresponding to the distance of lowering of the apparatus between successive readings, the components of the resultants of Figure 25 in east-west and north-south vertical planes.

In the operation of surveying a well, the apparatus is first secured to the lower end of the first pipe stand, and before lowering, the stand may be gyrated in an inclined position in order to establish reference markings on the tapes to indicate the starting point. The power unit is then started in its operation by dropping the stand a short distance and then bringing it to a sudden stop in order to trip the weighted starting lever. The stand thereafter is lowered at a constant rate of speed during which time a continuous record of the course of the apparatus is recorded on the marking tapes and an azimuth reading is recorded on the corrugated chart. The operation of the power unit is so timed that shortly after the stand is lowered, the recording mechanism automatically stops, whereupon another stand is added to the pipe string and the described procedure of starting and lowering repeated. It will be noted that although in this case the recording mechanisms operate intermittently, continuous curves illustrating the vertical deviation of the well are recorded on the tapes, and successive readings of the bearings of the apparatus in azimuth are recorded at successive intervals and with suitable frequency to clearly define the course of the well. Inasmuch as the recording tapes are moved a predetermined distance during the lowering of each pipe stand, and since the intervals of recording on the corrugated chart are known, by noting the number of stands added to the pipe in the operation of lowering the surveying apparatus, it will be readily apparent that the bearing of the apparatus at any position in the well may be ascertained upon interpolation of the marking on the chart and tapes.

It will be understood the drawings and description are to be considered merely as illustrative of and not restrictive on the broader claims appended hereto, for various changes in design, structure and arrangement may be made without departing from the spirit and scope of said claims.

We claim:

1. In well surveying apparatus, a vertical deviation recording device comprising, means for resolving the vertical deviation into two components, and a unitary control means for operating both said resolving means in accordance with the degree of inclination of the apparatus.

2. In well surveying apparatus, a vertical deviation recording device comprising, means for resolving the vertical deviation into two components, and a single pendulum for operating both said resolving means.

3. In well surveying apparatus, a vertical deviation recording device comprising, a pair of interconnected members for resolving the vertical deviation into two right angle components, and a single gravity controlled means for operating said resolving means, in accordance with the degree of inclination of the apparatus.

4. In a well surveying apparatus, a vertical deviation recording device comprising, a pair of horizontally movable and interconnected marking arms extending horizontally at right angles with each other, and gravity controlled means for moving said arms horizontally in accordance with the vertical deviation of the apparatus.

5. In a well surveying apparatus, a vertical deviation recording device comprising, a pair of horizontally movable and interconnected marking arms extending horizontally at right angles with each other, gravity controlled means for moving said arms horizontally in accordance with the vertical deviation of the apparatus, and means for preventing lateral turning movement of the arms.

6. In a well surveying apparatus, a vertical deviation recording device comprising, a horizontally movable marking arm, a pendulum below said arm and mounted for universal swinging movement at a point below its upper end, and a connection between the upper end of said pendulum and the arm whereby only the horizontal component of the pendulum swinging movement is imparted to the arm.

7. In a well surveying apparatus, a vertical deviation recording device comprising, a pair of horizontally movable and interconnected marking arms extending horizontally at right angles with each other, a pendulum mounted below said arms, and a lost motion connection between the pendulum and the arms comprising, a tubular element depending from the arms at their juncture, and an extension on the pendulum projecting upward within said tubular element and having vertical movement therein upon swinging movement of the pendulum.

8. In a well surveying apparatus, a vertical deviation recording device comprising, a pair of horizontally movable and interconnected marking arms extending horizontally at right angles with each other, marking means on the ends of said arms, a single gravity controlled means for moving said arms horizontally in accordance with the vertical deviation of the apparatus, a clockwork motor for passing recording tapes beneath said marking means, said clock-work being intermittently operable during predetermined periods of time, and inertia controlled means for starting said motor in operation.

9. An apparatus of the character described, embodying means for suspending the apparatus within a well, intermittently operable means for recording the vertical inclination of the apparatus, said means including a movable record receiving element, means for actuating said element, and means controlled by inertia for controlling the operation of said actuating means.

10. An apparatus of the character described, embodying means for suspending the apparatus within a well, intermittently operable means for recording the vertical inclination of the apparatus, said means including a movable record receiving element, means for actuating said element, and means controlled by inertia for controlling the operation of said actuating means, the last mentioned means including a weight mounted for movement relative to the actuating means and operable by movement of the suspension means.

11. An apparatus of the character described, embodying means for suspending the apparatus within a well, intermittently operable means for recording the vertical inclination of the apparatus, said means including a movable record receiving element, means for actuating said element, and means controlled by inertia for controlling the operation of said actuating means, the last mentioned means including a weight mounted for vertical movement relative to the actuating means and operable by vertical movement of the suspension means.

12. In a well surveying apparatus, means for making successive records of the vertical inclination of the apparatus and including movable record receiving means; a clockwork motor for operating said record receiving means, said motor being intermittently operable to actuate said record receiving means, and means controlled by inertia for controlling the operation of said motor.

13. An apparatus of the character described comprising a body and means for suspending and lowering the body within a well, a mechanism within said body for making successive records of the direction of its vertical inclination as it is lowered, said mechanism including movable record receiving means, means for actuating said record receiving means, and a relatively movable member pivotally mounted within said body and adapted to be actuated by movement of the suspension means to control the operation of said actuating means.

14. An apparatus of the character described comprising a body and means for suspending and lowering the body within a well, a mechanism within said body for making successive records of the direction of its vertical inclination as it is lowered, said mechanism including movable record receiving means, means for actuating said record receiving means, and a pivotally mounted, vertically movable member within said body and adapted to be actuated by vertical movement of the suspension means to control the operation of said actuating means.

FREDERICK STONE.
ALBERT L. STONE.
CLARENCE R. DALE.
LESTER C. NIELSON.
ROY A. SILENT.
AUGUST R. MAIER.